United States Patent [19]
Barrett

[11] Patent Number: 5,737,203
[45] Date of Patent: Apr. 7, 1998

[54] CONTROLLED-K RESONATING TRANSFORMER

[75] Inventor: Alfred Henry Barrett, Carmel, Ind.

[73] Assignee: Delco Electronics Corp., Kokomo, Ind.

[21] Appl. No.: 316,969

[22] Filed: Oct. 3, 1994

[51] Int. Cl.⁶ .................................................. H02M 5/10
[52] U.S. Cl. .................. 363/75; 363/93; 323/355; 336/155
[58] Field of Search ...................... 323/355, 361, 323/362; 363/17, 75, 91, 92, 93, 98, 132; 336/155, 160

[56] References Cited

U.S. PATENT DOCUMENTS

| | | | |
|---|---|---|---|
| Re. 27,916 | 2/1974 | Kakalec | 323/61 |
| Re. 28,359 | 3/1975 | Hart et al. | 323/56 |
| 2,143,745 | 8/1939 | Sola | 171/119 |
| 2,896,180 | 7/1959 | Brown | 336/155 |
| 2,911,586 | 11/1959 | Zelina | 336/155 |
| 2,938,180 | 5/1960 | DeWitz | 333/78 |
| 2,975,298 | 3/1961 | Fawcett et al. | 336/155 |
| 3,122,699 | 2/1964 | Schohan | 323/83 |
| 3,148,326 | 9/1964 | Baycura et al. | 323/56 |
| 3,253,212 | 5/1966 | Wentworth | 323/56 |
| 3,505,588 | 4/1970 | Brock | 336/155 |
| 3,525,035 | 8/1970 | Kakalec | 323/61 |
| 3,573,605 | 4/1971 | Hart et al. | 323/56 |
| 3,573,606 | 4/1971 | Hart et al. | 323/60 |
| 3,965,408 | 6/1976 | Higuchi et al. | 321/25 |
| 4,495,555 | 1/1985 | Eikelboom | 323/28 |
| 4,766,365 | 8/1988 | Bolduc et al. | 336/155 X |
| 4,876,638 | 10/1989 | Silva et al. | 363/97 |
| 4,907,246 | 3/1990 | Kleiner | 323/361 X |
| 4,935,862 | 6/1990 | Herbsleb et al. | 363/132 |
| 5,216,585 | 6/1993 | Yasumura | 363/19 |

Primary Examiner—Peter S. Wong
Assistant Examiner—Y. J Han
Attorney, Agent, or Firm—Mark A. Navarre

[57] ABSTRACT

An LC resonant circuit. The resonant circuit includes a resonant capacitor and a transformer. The transformer comprises a magnetic core having a primary winding, secondary winding and control winding wound on the core. The primary winding is loosely coupled with the secondary winding. The resonant capacitor of the circuit is connected in series with the primary winding of the transformer. The control winding saturates the core in response to the application of direct current thereto to control the output of the resonant circuit.

14 Claims, 10 Drawing Sheets

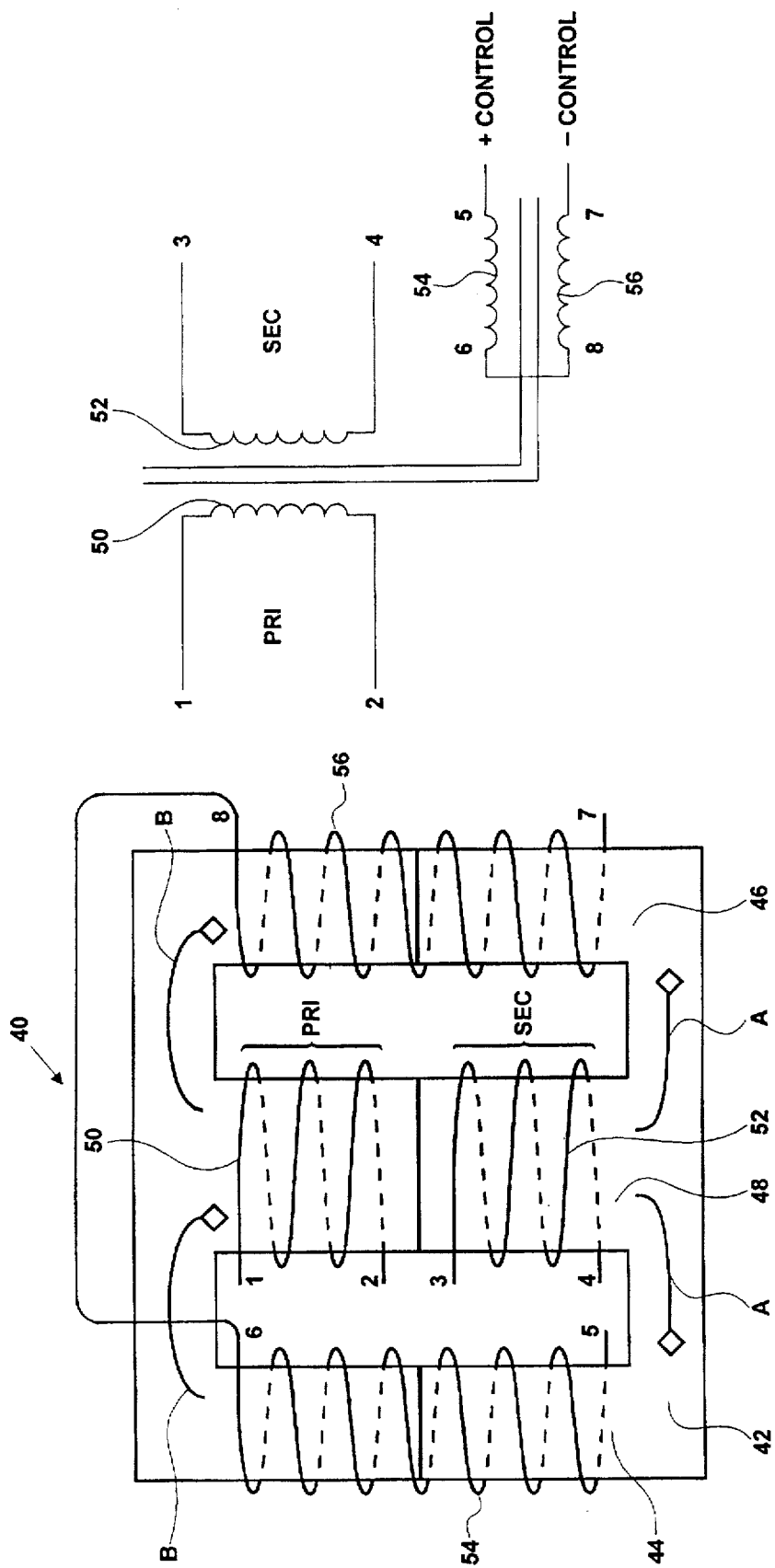

CONTROLLED-K RESONATING TRANSFORMER

BACKGROUND OF THE INVENTION

1. Field of the Invention

The present invention relates to a transformer, and, more particularly, to a transformer for use with a resonant converter.

2. Description of the Related Art

Transformers are commercially employed in a myriad of applications including battery chargers, communication systems, electric furnaces, electric tools, personal computers, and electric toys, to name a few. The control or regulation of the output of transformers has been accomplished by a variety of devices, including preregulation with devices such as pulse width modulation (PWM) inverters, saturable reactors, magnetic amplifiers, and ferroresonant regulators. For PWM inverters, the pulse width of the original input to the transformer is adjusted to result in a change in the transformer's output.

Saturable reactors, which may be employed in magnetic amplifiers and ferroresonant regulators, operate on the general principle that a change in the degree of saturation of the core may be accomplished by adjusting the direct current provided to an additional core winding. The core of a saturable reactor is generally magnetically hard such that saturation results in switching of the device. Magnetic amplifiers modulate the flow of alternating current to a load in response to a DC input signal. In ferroresonant regulators, such as those disclosed in U.S. Pat. Nos. RE28,359, 3,148, 328, RE27,916, 3,573,605, 3,573,606 and 3,965,408, for example, tuning is accomplished by varying circuit voltage or current. Consider, for example, the closed loop ferroresonant regulator of RE28,359, wherein the output voltage of the regulator is adjusted by varying the rate of charge of the integrating capacitor.

Resonant converters are also employed in power conversion applications for control and regulation and are advantageous over PWM inverters, saturable reactors, magnetic amplifiers and ferroresonant regulators in many respects. Theoretically, there is no switching loss with a series resonant converter when the waveform of the current flowing through the circuit's switch element is sinusoidal and goes through zero such that the switch element need not forcibly turn the current off. Also, less noise is produced with resonant converters than with other types of converters. Further, the output current of resonant converters is essentially constant over a range of output voltage to allow the converter to be protected in the event of an overload or a short circuit in the load.

Though the basic concepts involving resonance in electrical circuits were developed during the early days of the development of radio technology over fifty years ago, the evolution of resonant technology has been generally limited to the resolution of specific problems. A brief look at the history of power supplies is instructional when comparing PWM converters to resonant converters.

Early power supplies often used a line frequency power transformer and a linear regulator consisting of vacuum tubes or, in later supplies, power transistors. These early power supplies were generally large, heavy and inefficient. DC-DC type power supplies used mechanical vibrators, vacuum tubes or switching power transistors to accomplish inversion (DC to AC transformation) when isolation or a significant voltage transformation was required. When vacuum tubes or switching transistors were employed, the regulation function of the power supply was often accomplished by PWM or by pulse-frequency modulation. The introduction of silicon power transistors, which were capable of dissipating several hundred watts and switching in a few microseconds, had an impact on the popularity of PWM for regulation. Today, PWM still prevails as the means for regulating a majority of commercially available power supplies.

The availability of high speed silicon power transistors resulted in the emergence of PWM power supplies having increasingly higher feasible power levels. However, these power supplies were generally limited to only a few kilowatts. In the late 1960's, the silicon controlled rectifier, SCR, became available for use in operation at several kilowatts and above. However, because the SCR has no means by which it can interrupt its own current flow, i.e., self-commutate, forced commutation was necessary for the SCR to operate in DC systems. The need for forced commutation prompted the development of resonant circuits in which ringing is used to produce a reversal in current flow. Similarly, since the mid-1980's, resonant power technology is utilized with increased frequency in power circuits due to the introduction of other switching devices such as bipolar transistors, MOSFETs, IGBTs, etc. Though these devices, unlike SCRs, do not necessarily require the use of resonance, resonance can be employed where it is advantageous over PWM.

When operated at the resonant frequency of its tank (the combination of the transformer and its resonant capacitor) circuit, the series resonant converter has a pure sine wave of tank current at that frequency. Therefore, at the time the square wave of excitation voltage produces a voltage transition on its power switching devices, series resonant converters are not necessarily conducting current. Low switching losses are produced in these devices when the current is zero. Thus, this condition, commonly referred to as zero-current switching, is desirable. With series resonant converters the only significant loss is conduction loss; however conduction losses are not strongly related to operating frequency and therefore the series resonant converter can operate efficiently at a high frequency. For example, a resonant converter can be designed to operate efficiently at a frequency that is typically five to ten times higher than a PWM converter of the same power level using the same power switching devices.

A resonant converter is further advantageous as it produces little EMI. Because a resonant converter develops a sinusoid of current, as opposed to a fast rising quasi-square wave, little EMI is produced. Further, the components of the resonant converter are generally fewer in number and less costly than the components required for PWM. The resonant converter's components are also of a smaller volume and weight thereby permitting applicability of the converter in a smaller or more weight sensitive environment than is possible with PWM.

Control or regulation of the output DC voltage of a series resonant converter may be achieved by controlling the capacitance of the resonant capacitor of the circuit, the peak voltage, or the operating frequency of the circuit. Because the peak voltage is usually clamped to the power source and because it is difficult to continuously control capacitance, the operating frequency is usually controlled. Numerous embodiments of resonant converters wherein the operating frequency is controlled are discussed and disclosed in U.S. Pat. No. 4,679,129. Another frequency-controlled resonant connector is disclosed in U.S. Pat. No. 4,642,745. In U.S.

Pat. No. 4,642,745, an AC signal of a frequency greater than that of the AC power line is controlled to vary both the input current to the converter and the converter's output current. Both the duty cycle and the frequency of the AC signal are controlled to control the converter's output.

One of the problems encountered with frequency-controlled resonant converters is the potential for generating audible noise. To control power over a suitable range, a wide range of frequencies is required for such frequency control. Frequency-controlled power converters, such as that disclosed in U.S. Pat. No. 4,679,129, have been developed to eliminate the problem of generation of audible noise. However, to avoid such noise generation, additional circuitry is added to the basic resonant power converter. The additional circuitry is undesirable as it adds to the manufacturing cost of the converter and increases the potential for degradation of reliability of the converter. Therefore, it is desired to develop a controlled resonant power converter which does not generate audible noise. It is also desired to develop a converter which is comprised of a minimal number of components, and in particular, is comprised of a minimal number of high power components which are expensive and often consume significant volume and space so as to adversely affect the size of packaging required for the converter.

In addition to single output applications, there are instances in which it is desirable to provide multiple outputs from a single power source. Consider, for example, the development of pure electric and hybrid electric vehicles, such as automobiles, in which electric power from a single source is used to supply power to numerous subsystems. Such subsystems may include a battery charger, auxiliary loads such as lights, and heating, ventilation and air-conditioning (HVAC) subsystems. Another example of a multiple output power application is the personal computer wherein several subsystems, such as a card rack, hard disk drive, and floppy disk drive, are to be driven by a single power supply.

The provision of power to multiple outputs from a single power supply is complicated in the event each output requires separate control or regulation. In the above-mentioned electric vehicle example, for instance, the power supplied to auxiliary loads may be required to be a standard 12 volt DC signal while the HVAC subsystem requires a signal voltage greater than 12 volts DC. When using prior art regulated transformers in multiple output applications wherein each output is to be independently regulated, cost savings resulting from implementation of a single power supply may be negated by the need to provide separate mechanisms for regulating each of the outputs.

Separate regulating mechanisms are generally required for each output as the regulators adjust the input to a transformer. For example, when using a PWM inverter to drive a high frequency isolation transformer, each output requires a separate PWM inverter for independent load control and regulation. The need for each output to become associated with its own regulation stage results in an increase in cost and a degradation of reliability due to the number of components required for independent control of each output.

For resonant converters, in which regulation is achieved by controlling the operating frequency, separate regulation is also generally required for each output in a multiple output application. An improved dual output DC-DC converter is disclosed in U.S. Pat. No. 4,628,426. In this converter, control of one of the outputs is achieved by pulse-width modulation while control of the other output is accomplished by frequency adjustment. The converter of U.S. Pat. No. 4,628,426 is advantageous over some multiple output converters in that only a single power switching stage is required for both outputs rather than requiring a power switching stage for each output. However, if more than two independently controlled outputs are required in an application of the converter of U.S. Pat. No. 4,628,426, additional conventional regulators are used to support the additional outputs. It is therefore desired to provide a transformer for use in a multiple output power conversion application that limits the number of regulatory components required to provide independent control of each output to thereby minimize the cost of the circuitry and also reduce potential degradation of reliability of the circuit. Under ideal circumstances, it is preferable to utilize only one power switching stage for the support of a multitude of independently controlled outputs.

In addition to the problems associated with independent control of each output in a multiple output application, control of single or multiple outputs in some applications is generally limited. Consider, for example, the relationship between the desired output voltage and the desired output current. As previously stated herein, an advantage of series resonant converters is the ability to obtain a relatively constant output current over a range of output voltages. However, at a particular output voltage (i.e., when the output voltage at which the input/output voltage transformation ratio is unity which is referred to herein as the "output voltage threshold"), the output current of the converter drops rapidly to zero. Therefore, beyond the output voltage threshold, essentially no current is output from the converter. This current characteristic is troublesome when the input voltage to the converter decreases. Specifically, a decrease in input voltage results in lower output current over a narrower range of output voltage, i.e., up to a lower output voltage threshold. Thus, if input voltage decreases, it may not be possible to achieve the desired output current, or any current at all, at a particular value of output voltage. For example, upon startup of a power supply, such as a motor vehicle power supply, the initial input voltage provided to the converter is less than during normal operation. Therefore, at power-up, insufficient (i.e. essentially zero) current may result at the required output voltage to drive the load connected to the output. It is therefore desired to provide controllable power conversion circuitry which yields output current beyond the output voltage threshold of conventional series resonant converters. In this manner, the converter yields sufficient output current to drive a load connected to the converter's output under lower input voltage circumstances than is possible with conventional power conversion circuitry.

SUMMARY OF THE INVENTION

The present invention provides an LC resonant circuit comprising a resonant capacitor and a control transformer. The circuit may be employed in both single output and multiple output power conversion applications. Use of the circuit in multiple output applications provides a mechanism by which each output may be independently regulated at a lower manufacturing cost, with improved reliability and with smaller packaging required of the converter when compared to prior art multiple output power converters. Also, output current may be generated at lower values of input voltage when compared to conventional series resonant converters.

The invention comprises, in one form thereof, an LC resonant circuit comprising a resonant capacitor and a transformer. The transformer includes a magnetic core and a primary winding, a secondary winding and a control winding wound on the core. The primary winding is loosely coupled with the secondary winding and is connected in series with the resonant capacitor of the resonant circuit. The control winding saturates the core in response to the application of direct current thereto to thereby control the output of the resonant circuit.

In one embodiment, the core of the transformer comprises an E-shaped core having first, second and third legs, wherein the third leg is positioned between the first and third legs. The primary and secondary windings are both wound about the third leg of the core. The control winding comprises first and second DC control windings. The first DC control winding is wound on the first leg of the core and the second DC control winding is wound on the second leg of the core. The first and second DC control windings are electrically interconnected in series or in parallel.

In another embodiment, the core of the transformer comprises first and second toroidal cores whose centers are vertically aligned. The primary winding is wound on both the first and second toroidal cores on one side of the centers of the cores. The secondary winding is wound on both toroidal cores opposite, with respect to the core's centers, the position of the primary winding. The control winding includes first and second DC control windings which are electrically interconnected. The first DC control winding is wound on the first toroidal core between the primary and secondary windings. The second DC control winding is wound on the second toroidal core between the primary and secondary windings.

In yet another embodiment thereof, the transformer of the circuit comprises an E-shaped core with each of the core's three legs having first and second halves. The primary winding includes first and second primary windings which are electrically interconnected in series. The first primary winding is wound on the first half of the first leg and the second primary winding is wound on the first half of the second leg. Similarly, the secondary winding includes first secondary winding wound on the second half of the first leg and second secondary winding wound on the second half of the second leg. The control winding of the transformer is wound on both halves of the center leg of the E-shaped core.

In still another embodiment, the core of the transformer comprises first and second vertically aligned toroidal cores. The primary winding includes first and second primary windings electrically interconnected in series. The first primary winding is wound on one side of the center of the first toroidal core and the second primary winding is wound on the second toroidal core on the same side of the center of the core as is located on the first primary winding. The secondary winding comprises first and second secondary windings interconnected in series with the first secondary winding wound on the first toroidal core opposite the first primary winding and the second secondary winding wound on the second toroidal core opposite the second primary winding. The control winding is wound on both the first and second toroid cores and is positioned between the first primary winding and the first secondary winding on the first toroidal core and between the second primary winding and the second secondary winding on the second toroidal core.

In the final embodiment presented, the transformer is wound on a single, two-piece toroidal core. This core is comprised of two similar core halves mated at the equator of the core. (The two halves need not be equal in height; in this case, the mating would not be at the equator.) The DC control winding is enclosed within the mated core halves. The primary winding is wound on one-half (or less) of the assembled core. Similarly, the secondary is wound on the other half. Due to the orthogonal relationship of control flux and AC flux, this embodiment has nearly complete isolation of the control winding from the power windings.

In another form thereof, the series resonant converter also comprises a DC power supply and a means for controlling the level of direct current applied to the control winding. The control means is connected to the DC power supply and to the control winding. The control means may comprise a voltage comparator for comparing the output voltage of the converter to a reference voltage and adjusting the level of DC control current applied to the control winding accordingly.

An advantage of the present invention is the provision of a transformer for use with a resonant converter, thereby resulting in conversion circuitry which inherently produces little noise, has little or no switching loss, produces little EMI, and is readily protectable from the occurrence of an overload or a short circuit in the load.

Another advantage is the provision of a transformer for use in a multiple output resonant converter wherein each output may be independently regulated without requiring a large number of regulatory components to thereby contain the cost of the multiple output circuitry, to reduce the potential degradation of reliability of the circuit, and to minimize the size of packaging required to house the circuitry.

Yet another advantage of the present invention is the provision of a controllable power converter yielding output current beyond the output voltage threshold (cutoff voltage) of a conventional series resonant converter.

Still another advantage is the provision of a controllable power converter which yields output current beyond the conventional output voltage threshold in circumstances in which the converter's input voltage is less than expected or desired.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein:

FIG. 3A is front view of one embodiment of the transformer of the present invention wherein the core is E-shaped and the control winding comprises two DC windings;

FIG. 3B is a schematic diagram of the transformer of the embodiment of FIG. 3A;

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
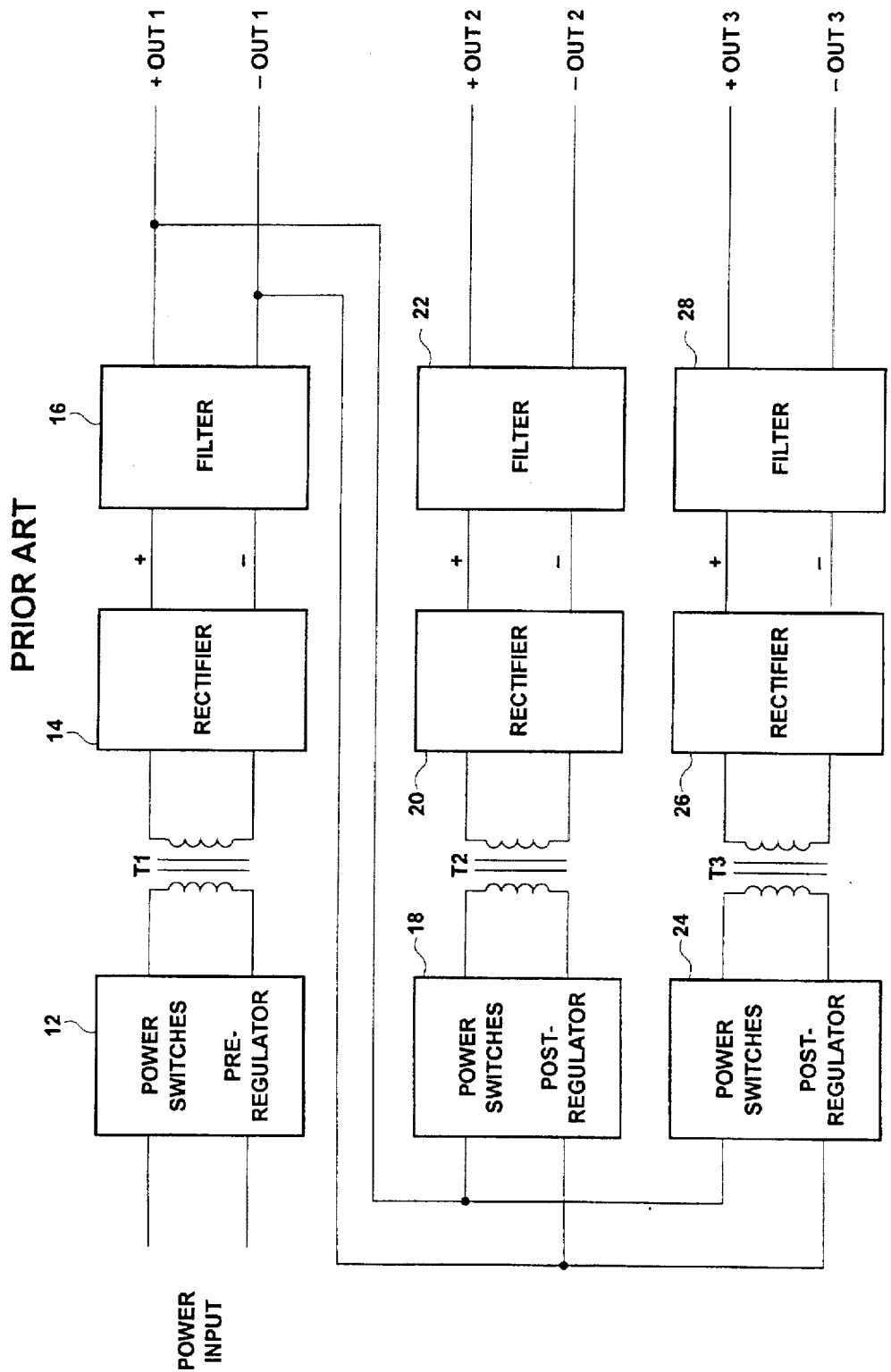
FIG. 1 is a block diagram of a power conversion circuit providing multiple regulated outputs from a single power supply, wherein the circuit is representative of the prior art.

Referring now to the drawings, and particularly to FIG. 1, there is shown a block diagram of a power conversion circuit providing multiple regulated outputs from a single power supply wherein the circuit is representative of the prior art. In this embodiment, the conversion circuit includes three independently regulated and galvanically isolated outputs, represented by OUT1, OUT2 and OUT3. Outputs OUT1, OUT2 AND OUT3 are generated from a single power source, namely, POWER INPUT. Specifically, power from POWER INPUT is supplied to preregulator 12, such as a pulse width modulated (PWM) inverter, which, in principle, controls OUT1 by adjusting the duty cycle of the conduction of the power switches. Preregulator 12 is used to drive high-frequency isolation transformer T1. The output from T1 is rectified by first rectifier 14 and filtered by first filter 16 to yield first regulated output OUT1. The signal of first output OUT1 is also used to create second and third outputs OUT2 and OUT3 so that second and third outputs OUT2 and OUT3 are also regulated and are galvanically isolated. Second rectifier 20 and second filter 22 are used to rectify and filter, respectively, first output OUT1 to yield second output OUT2. Third rectifier 26 and third filter 28 are used to rectify and filter first output OUT1 to yield third output OUT3.

The conversion circuit of FIG. 1 also includes first and second post-regulators, 18 and 24, and second and third transformers T2 and T3. Post-regulators 18 and 24 and transformers T2 and T3 are required for independent regulation of second and third outputs OUT2 and OUT3. Because regulation is achieved by adjusting the duty cycle of the signal, independent regulation of each output necessitates that regulating components (in this embodiment, the post-regulator and transformer components) be present for each output. Where high efficiency is required or where OUT2 and OUT3 are to supply a large amount of power, first and second post-regulators 18 and 24 may comprise a PWM inverter. Alternatively, post-regulators 18 and 24 may comprise saturable reactors or magnetic amplifiers. Regardless of the type of device used for post-regulation, conversion circuits of the prior art, such as that exemplified in FIG. 1, generally require a power switching stage for each output of the circuit.

The replication of regulating components to achieve independent regulation of each output has several shortcomings. The proliferation in the number of high power circuit components required not only renders the circuit as costly to manufacture, but may also make it difficult to meet packaging requirements for some applications due to the volume and weight of such components. In addition, a greater number of components also results in a degradation in the reliability of the circuit.

Figure 2:
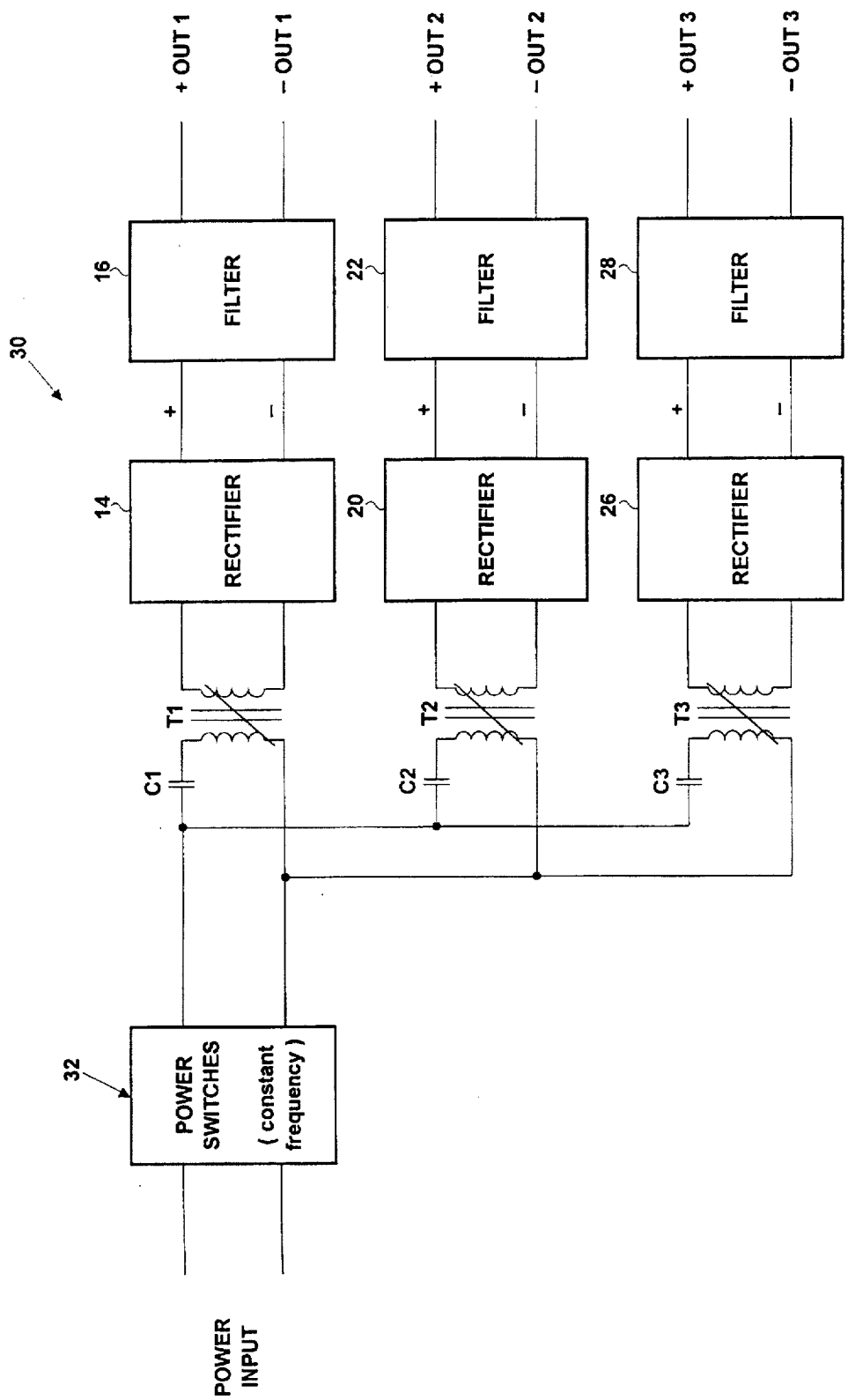
FIG. 2 is a block diagram of a power conversion circuit providing multiple regulated outputs from a single power supply which utilizes the transformer of the present invention.

FIG. 2 shows a block diagram of a power conversion circuit providing multiple regulated outputs from a single power supply which utilizes one embodiment of the transformer according to the present invention. As in the prior art, each output, OUT1, OUT2 and OUT3, of circuit 30 has been rectified and filtered by rectifiers 14, 20 and 26 and filters 16, 22 and 28. In this embodiment, however, no PWM preregulator or post-regulators are used. Rather, POWER INPUT is connected to power switches 32, the only power switching stage of circuit 30, an embodiment of which is seen in greater detail in FIG. 4. The output of power switches 32 is provided as input to transformers T1, T2 and T3 which are each in series resonance with capacitors C1, C2 and C3, respectively. As is explained in greater detail hereinafter, transformers T1, T2 and T3 according to the present invention may be independently controlled to result in independently regulated, galvanically isolated outputs OUT1, OUT2 and OUT3.

It will be appreciated by those of skill in the art that circuit 30 includes only one power switching stage, namely power switches 32, rather than a separate power switching stage for each output. As a result, circuit 30, when compared to the prior art circuit of FIG. 1, is advantageous as it is lower in cost by requiring fewer high power components to achieve independent regulation of each output. Reliability is improved by minimizing the number of high power components required, and the circuitry utilizes fewer and smaller components to thereby result in a circuit which may meet packaging requirements of a broader range. Specifically, packaging for circuit 30 is of lower weight and smaller volume than is the prior art circuit of FIG. 1.

Referring now to FIG. 3A, there is shown a front view of one embodiment of the transformer of the present invention. Transformer 40 includes E-shaped core 42 having first leg 44, second leg 46 and third, or center, leg 48 positioned between first leg 44 and second leg 46. In this embodiment, core 42 is comprised of soft ferrite material, such as Magnetics F material or Siemens N-27 material and there are no gaps in legs 44, 46 and 48. Wound about one-half of center leg 48 is first primary winding 50. Secondary winding 52 is wound on the other half of center leg 48. Thus, primary winding 50 and secondary winding 52 are loosely coupled. First DC control winding 54 is wound on both halves of first leg 44 as shown, and second DC control winding 56 is wound on both halves of second leg 46.

The leakage inductance, $L_{leak}$, of transformer 40, as determined by measuring the primary inductance of transformer 40 with secondary winding 52 and first and second DC control windings 54 and 56 shorted, is designed to resonate with the respective tank capacitance. As used herein, "tank" refers to the combination of a transformer and resonant capacitor, for example, C1 and T1. Therefore, transformer T1 of FIG. 2 is designed to resonate with capacitor C1. The resulting tank characteristic impedance $Z_o$, is:

$$Z_o = (L_{leak}/C)^{**}(\frac{1}{2})$$

wherein C is the capacitance of the capacitor in the tank. $Z_o$ is chosen to provide the maximum output current at a fixed operating frequency, $F_o$, and at the designed resonating frequency, $F_r$.

The magnetizing inductance, $L_{mag}$, of transformer 40 is determined by measuring the primary inductance with secondary winding 52 open circuited and DC control windings 54 and 56 short circuited. Transformer 40 is designed such that $L_{mag}$ is much greater than $L_{leak}$. For example, $L_{mag}$ may typically be twenty-five times greater than $L_{leak}$.

DC control windings 54 and 56 are designed to provide a DC amp-turn product adequate to drive the material of core 42 into deep saturation at the maximum value of control current provided to DC windings 54 and 56. Unlike multi-output circuits employing a magnetic amplifier or saturable reactor, core 42 does not switch to the lower two quadrants of its B-H curve. Rather, transformer 40 uses unipolar saturation. As a result, transformer 40 operates with relatively low power loss and low noise. Transformer 40 is designed for use with a resonant converter which has an inherent current source characteristic as previously described (see also the description accompanying FIG. 6). Transformer 40 is not suitable for controlling the output of an inverter, such as a PWM inverter, which has an inherent voltage source characteristic as the magnetizing current of transformer 40 may increase to intolerable levels when core 42 is driven toward saturation.

The control winding of transformer 40 comprises first and second DC windings 54 and 56 connected in either series or parallel. FIG. 3B shows a schematic of transformer 40 wherein first and second DC control windings are connected in series. First and second DC windings 54 and 56 are phased so that the voltages induced in DC windings 54 and 56 cancel each other at operating frequency $F_o$. Such phasing means that only the desired DC control current applied to DC control windings 54 and 56 flows through DC control windings 54 and 56. Relatively little alternating current flows through first and second DC control windings 54 and 56.

The AC flux path of transformer 40 is illustrated in FIG. 3A as direction A. The DC flux path is denoted by direction B. The AC flux return path is through first and second legs 44 and 46 of core 42. Therefore, by saturating first and second legs 44 and 46 by the application of a DC control current to first and second DC windings 54 and 56, the AC flux of transformer 40 is thereby controlled. As previously stated, such saturation does not result in switching of core 42.

It will be appreciated by those of skill in the art that transformer 40 is only useful in resonant applications, not in PWM applications, as previously stated. Also, the transformer may serve as the only inductance in a resonant circuit. No separate inductor is required. Further, transformer 40 provides isolation as a full transformer. Because resonant circuits inherently produce low noise, the transformer is further advantageous in that it too results in low noise. Perhaps the only shortcoming of the transformer of the present invention is its potential losses. However, it will be appreciated that the losses of the transformer are less of a constraint when the transformer is employed in low power applications.

It will also be appreciated that control of DC current to DC control windings 54 and 56 affects both the coupling, K, of primary and secondary windings 50 and 52 as well as the magnetizing inductance. Specifically, the application of DC control current to DC windings 54 and 56 allows one to invoke a controlled permeability change of ferrite core 42 to thereby effect a change in the coupling between primary and secondary windings 50 and 52.

Figure 3D:
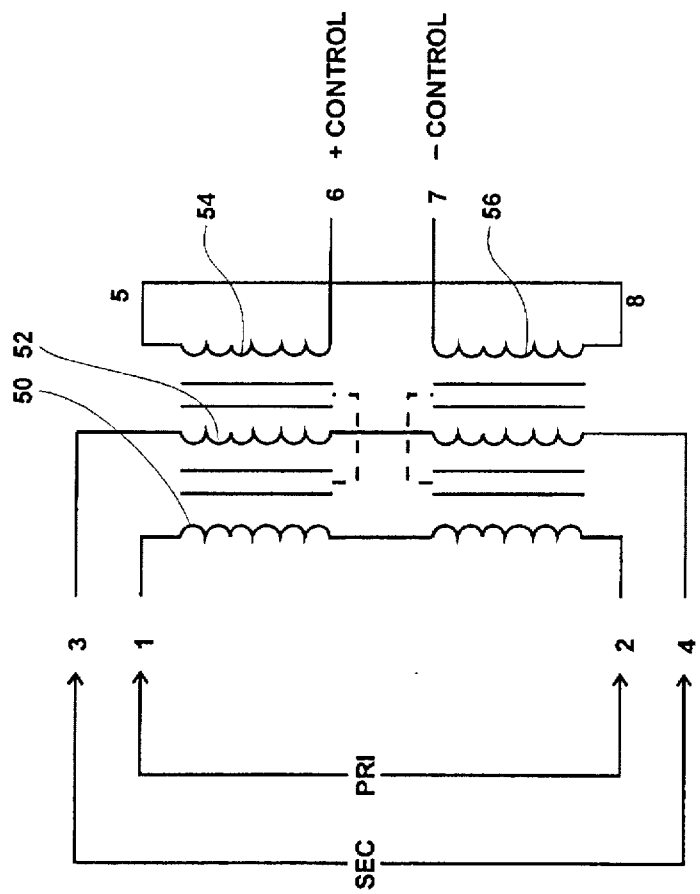
FIG. 3D is a schematic diagram of the transformer of the embodiment of FIG. 3C.
Figure 3C:
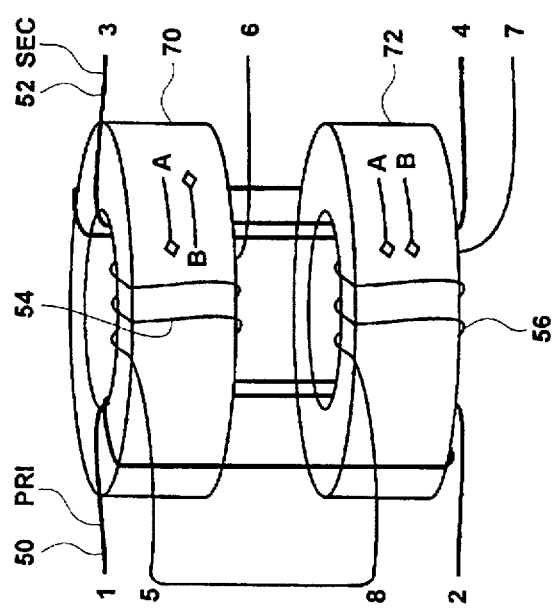
FIG. 3C is a perspective view of a second embodiment of the transformer of the present invention wherein the core includes two toroidal cores and the control winding comprises two DC windings.

Referring now to FIG. 3C, there is shown a perspective view of a second embodiment of the transformer of the present invention. Like the embodiment of FIGS. 3A–B, the transformer includes first primary winding 50, secondary winding 52, and first and second DC control windings 54 and 56, respectively. In this embodiment, however, the core comprises first and second toroidal cores 70 and 72, respectively, having centers which are vertically aligned. First DC control winding 54 is wound (typically uniformly) on first toroidal core 70. Second DC control winding 56 is wound (typically uniformly) on second toroidal core 72. Both primary and secondary windings 50 and 52 are wound on both first and second toroidal cores 70 and 72 on opposite sides of the centers of toroidal cores 70 and 72. As seen in FIG. 3D, the schematic of the transformer of FIG. 3C, first and second DC control windings are connected in series in this embodiment.

As in the embodiment of FIGS. 3A–B, the leakage inductance, $L_{leak}$, of the transformer of FIGS. 3C–D is designed to resonant with its tank capacitance when utilized in a series resonant converter. Also, the magnetizing inductance, $L_{mag}$, of the transformer is much greater than $L_{leak}$ and the range of control of the transformer depends on $L_{leak}$. A design having the least coupling between its primary and secondary windings has the greatest range of control. Primary and secondary windings 50 and 52 are also loosely coupled in the embodiment of FIGS. 3C–D by winding them on opposite halves of the cores. Also, first and second DC control windings 54 and 56 are so phased to produce nearly complete cancellation of AC in control windings 54 and 56.

Figure 3F:
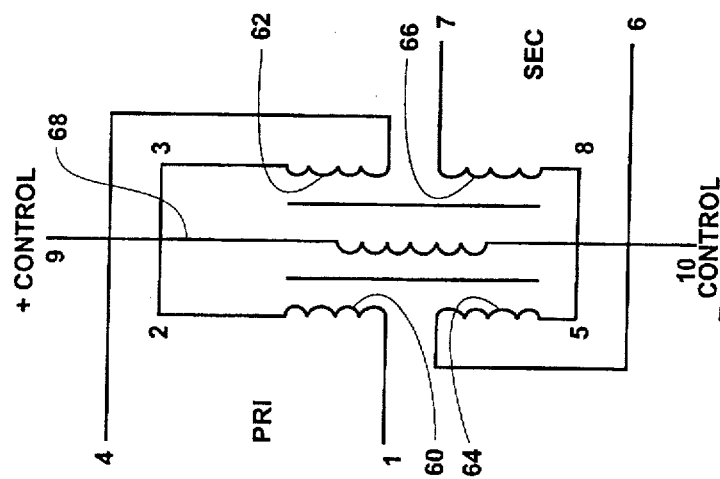
FIG. 3F is a schematic diagram of the transformer of the embodiment of FIG. 3E.
Figure 3E:
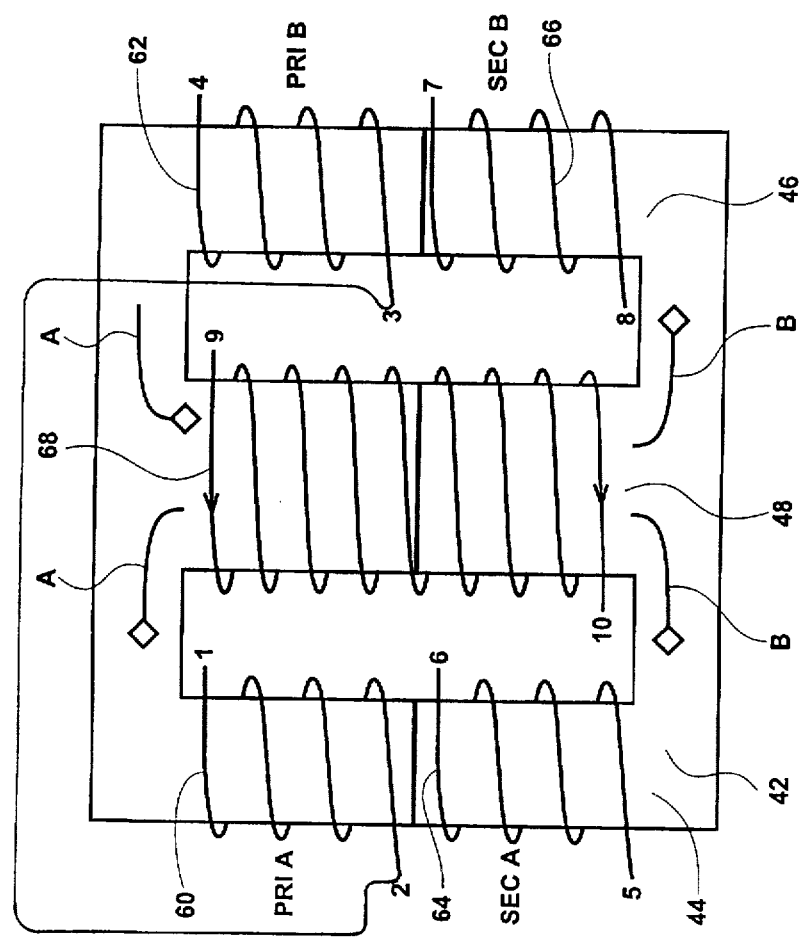
FIG. 3E is a front view of a third embodiment of the transformer of the present invention wherein the core is E-shaped and a single control winding is utilized.

FIGS. 3E and 3F show a front view and a schematic diagram, respectively, of a third embodiment of the transformer of the present invention. In this embodiment, two primary windings, two secondary windings and a single control winding are employed. Specifically, first primary winding 60 is wound on one half of first leg 44 of core 42 and its counterpart, second primary winding 62, is wound on the same half second leg 46 of core 42. First primary winding 60 is connected in series to second primary winding 62. Similarly, first secondary winding 64 is wound on one half of first leg 44 of core 42 and is connected in series with second secondary winding 66 which is wound on the comparable half of second leg 46 of core 42. Collectively, first and second primary windings 60 and 62 are loosely coupled with first and second secondary windings 64 and 66, and the AC flux is minimal in center leg 48 of core 42. Wound about center leg 48 is control winding 68.

It will be appreciated by those of skill in the art that although there is no gap shown between the halves of the E-shaped core in either the embodiment of FIGS. 3A–3B or the embodiment of FIGS. 3E–F, the halves of E-shaped core 42 may be separated. Such separation results in a reduction in the coupling between the primary and secondary windings and therefore reduces the control range of the transformer. Separation also reduces the magnetizing inductance, $L_{mag}$, of the transformer. Therefore, separation of the halves of the E-shaped core creates an effect which is similar to that of using a non-zero value of minimum control current as is described in further detail in association with FIG. 6.

Therefore, applications may exist in Which a gap between the halves of an E-shaped core may be desired.

Figure 3H:
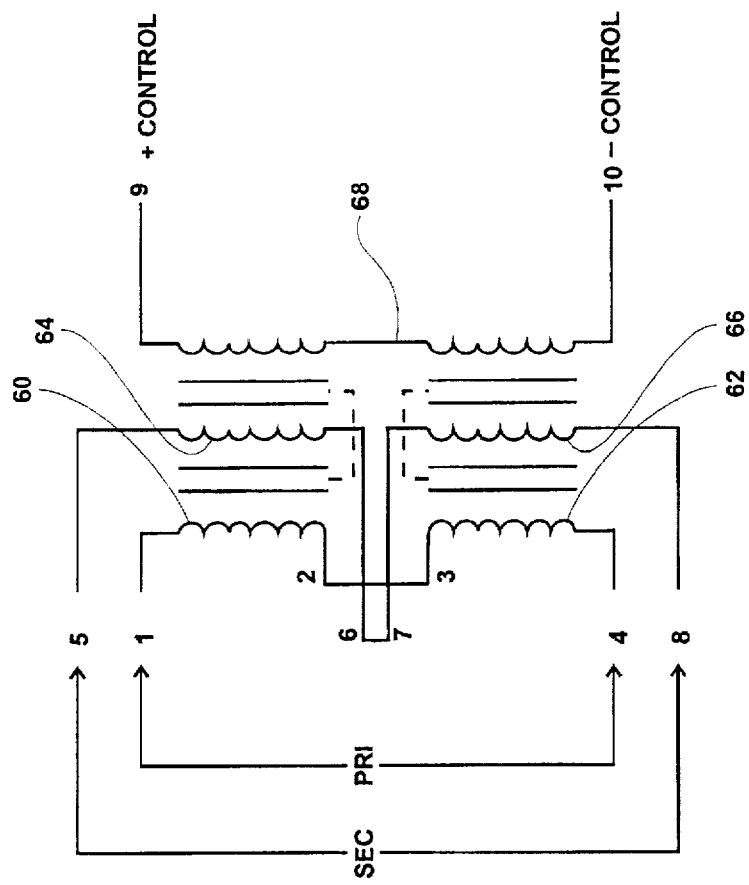
FIG. 3H is a schematic diagram of the transformer of the embodiment of FIG. 3G.
Figure 3G:
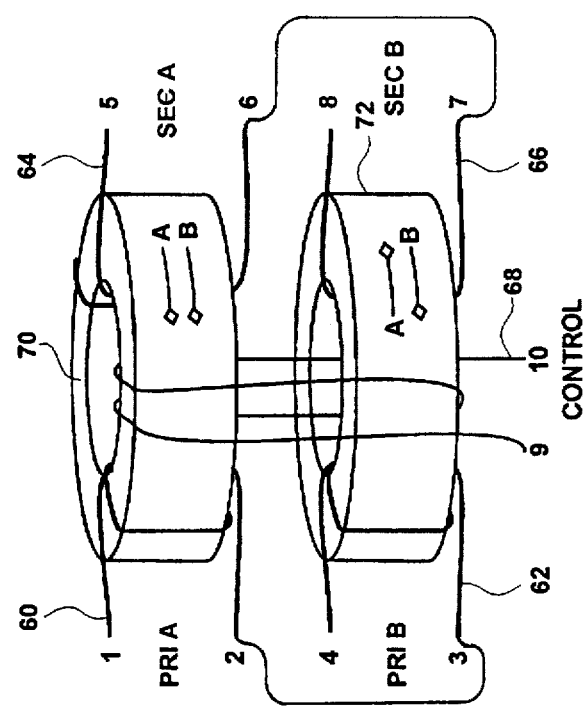
FIG. 3G is a perspective view of a fourth embodiment of the transformer of the present invention wherein the core includes two toroidal cores and a single control winding is utilized.

Referring now to FIGS. 3G and 3H, there is shown a perspective view and a schematic diagram of a fourth embodiment of the transformer of the present invention. Like the embodiment of FIGS. 3C-3D, this transformer uses first and second toroidal cores 70 and 72. As in the embodiment of FIGS. 3E-F, two primary windings, two secondary windings and a single control winding are employed. Specifically, first primary winding 60 is wound on first toroidal core 70 and is connected in series with second primary winding 62 which is wound on second toroidal core 72. First and second primary windings 60 and 62 are wound on the same side of center toroidal cores 70 and 72. First secondary winding 64 is wound on first toroidal core 70 opposite first primary winding 60. First secondary winding 64 is connected in series with second secondary winding 66 which is wound on second toroidal core 72 opposite second primary winding 62. Control winding 68 is wound on both first and second toroidal cores 70 and 72. On first toroidal core 70, control 68 is positioned between first primary winding 60 and first secondary winding 64. On second toroidal core 72, control winding 68 is positioned between second primary winding 62 and second secondary winding 66.

It will be appreciated by those of skill in the art that the four embodiments of the transformer of the present invention illustrated in FIGS. 3A-3H all operate under the same principle. The primary winding(s) is (are) loosely coupled with the secondary winding(s) of the transformer. The control winding(s) is(are) designed to provide a DC amp-turn product adequate to drive the core material into deep saturation at the maximum value of control current applied to the control winding(s). The magnetizing inductance of the transformer is much greater than the leakage inductance of the transformer. Unlike a magnetic amplifier or saturable reactor, the transformer of the present invention uses unipolar saturation. And, because the core of the transformer does not switch, the transformer operates with relatively low power loss and noise.

The imperfect cancellation of AC in the control windings of the transformer embodiments represented in FIGS. 3A through 3H is inherent. This can be deduced with reference to FIG. 3A. Consider a point in time when the AC flux is flowing as depicted by the lines of flux A. The DC flux, which is time invariant, is depicted by the lines of flux B. First leg 44 has a total flux of B+A. It is consequently closer to saturation than second leg 46, which has a total flux of B−A. At this time, leg 44 has lower permeability than leg 46. Hence winding 54 has less AC output than winding 56. When the AC flux reverses direction, winding 54 will have more AC output than winding 56. Thus the summation of the AC produced by the connection of the control windings is not zero. The AC in the control windings can be reduced by lowering the AC/DC flux ratio.

Likewise, it can be seen that all the embodiments shown in FIGS. 3C through 3H have analogous means of producing AC in their control windings. In practice this is not a major problem, particularly at high operating frequencies. Efficient high frequency embodiments have relatively low AC/DC flux ratios to minimize core loss.

Figure 3K:
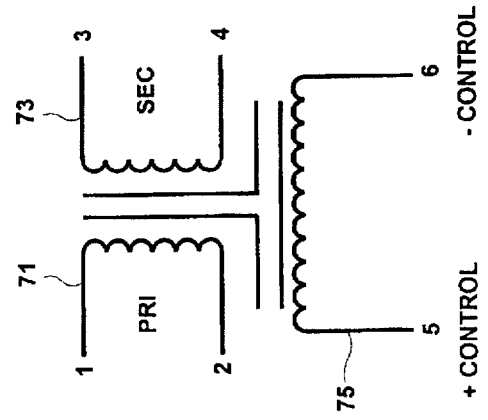
FIG. 3K is a schematic diagram of the transformer of the embodiment of FIG. 3I.
Figure 3J:
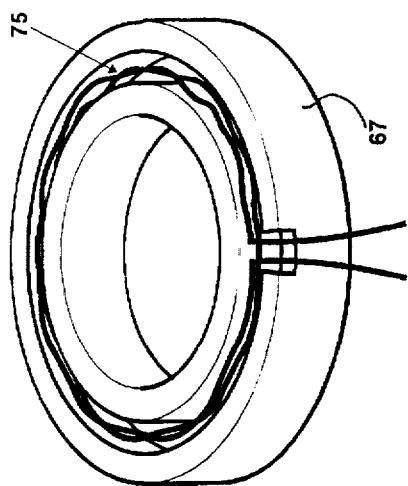
FIGS. 3I and 3J are isometric views of a fifth embodiment of the transformer of the present invention consisting of two toroidal core halves mated at the equator of the core.
Figure 3I:
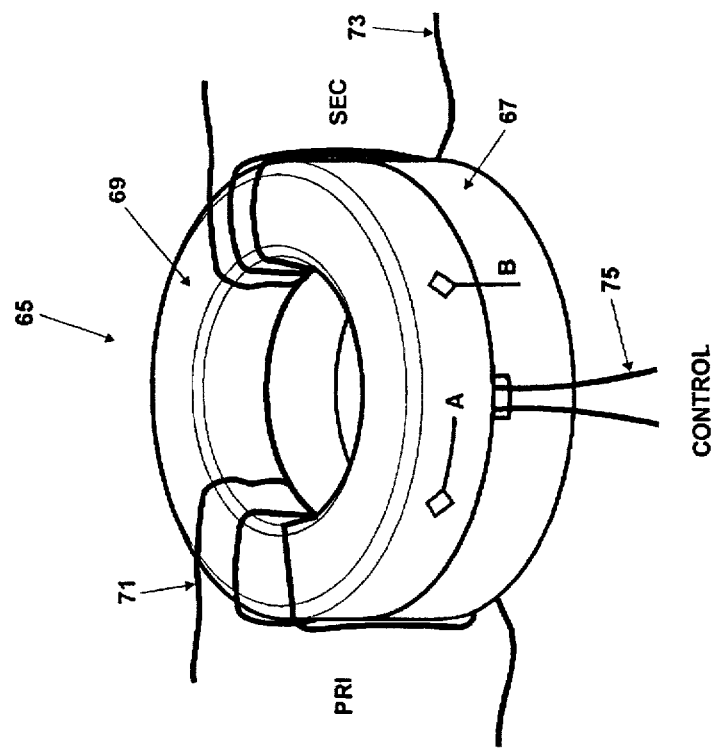

Certain embodiments which use DC flux paths orthogonal to AC flux paths eliminate this problem completely. FIGS. 3I and 3K show an isometric view and a schematic diagram, respectively, of such an embodiment. In the embodiment of FIG. 3I, the control winding is located entirely, except for its terminating leads, within the core. Primary and secondary windings are wound on opposite sides of the core. As this embodiment uses orthogonal flux control, it is markedly different from the first through the fourth embodiments, both in appearance and construction. The transformer 65 is wound on two similar, mating toroidal core halves 67 and 69. The DC control winding 75 is wound in a cavity located within the mating halves. The DC flux path is denoted by direction B. The primary winding 71 is wound over one half (or less) the toroid. The secondary winding 73 is wound over the other half (or less). The AC flux produced by high frequency excitation of the primary assumes the path of direction A.

Figure 4:
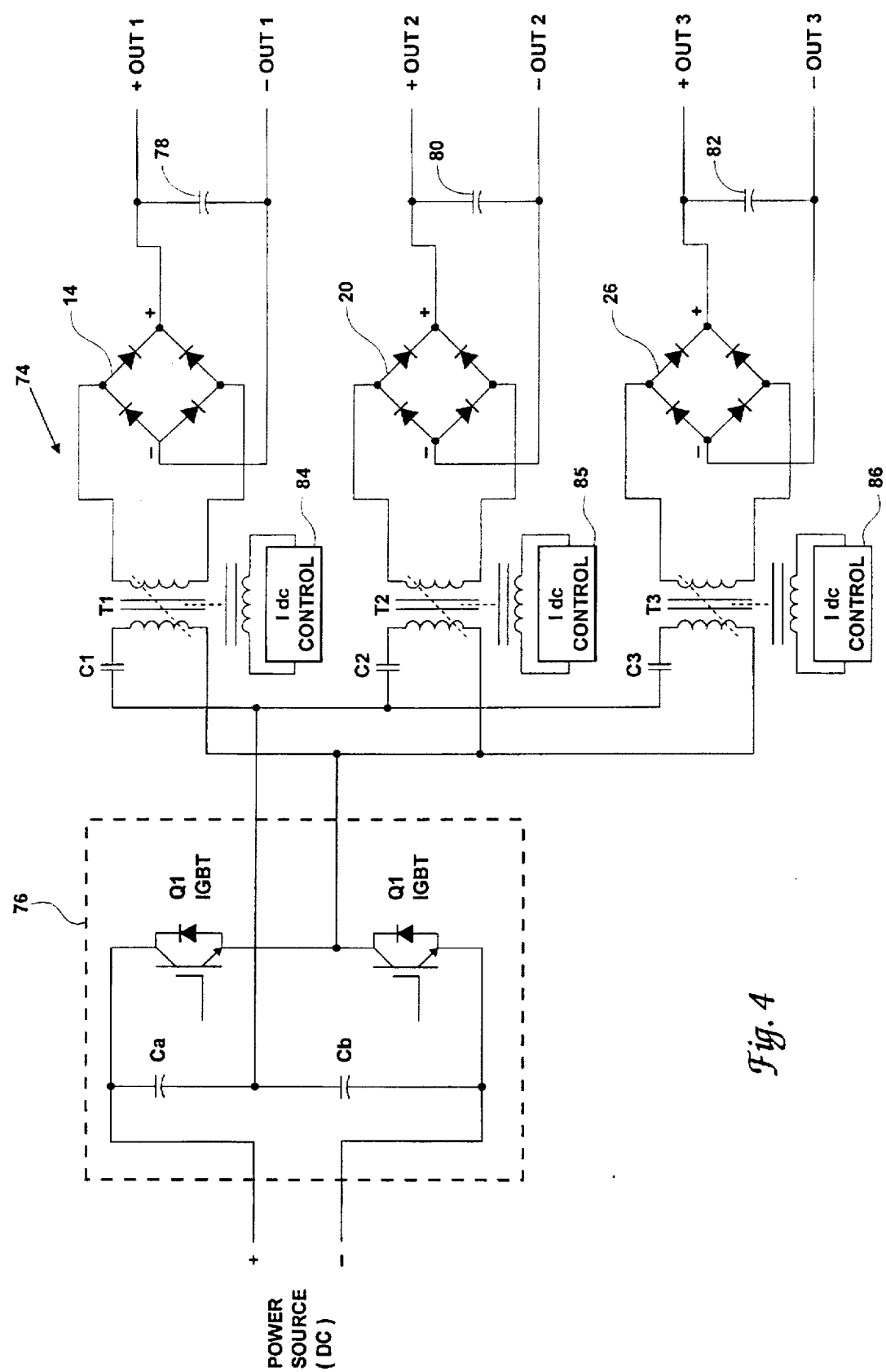
FIG. 4 is a partial schematic diagram of the multiple output circuit of the embodiment of FIG. 2.

FIG. 4 is a partial schematic diagram of the multiple output circuit of the embodiment of FIG. 2. In this embodiment, half-bridge inverter 76, consisting of IGBT's Q1 and Q2 and capacitors Ca and Cb, serves as the only power switching stage in circuit 74. IGBT's Q1 and Q2, such as part number MG300J2Y51 manufactured by Toshiba, driven by fixed frequency inputs, are the only power switches in circuit 60. Ca and Cb form an AC drive center point and are essentially uninvolved in the resonant action of the multiple output tanks. Specifically, the capacitance of Ca and Cb is much greater than the value of capacitance for C1, C2 and C3. Inverter 76 produces a quasi-square wave at a fixed operating frequency $F_o$. All three output tanks are driven by the quasi-square wave at operating frequency $F_o$.

In FIG. 4, transformers T1, T2 and T3 are of the type illustrated in FIGS. 3A-3J. Connected in series with the primary winding of each transformer, T1, T2 and T3 are resonant capacitors C1, C2 and C3, respectively. Each transformer/resonant capacitor pair is designed to resonant at a specific resonant frequency. The resonant frequency of each transformer/resonant capacitor pair may be the same or may be unique, depending on the output desired. Each transformer T1, T2, T3 is connected in series with a rectifier and a filter which comprises a capacitor. Specifically, first transformer T1 is connected to first rectifier 14 and first filter 78; second transformer T2 is connected to second rectifier 20 and second filter 80; and third transformer T3 is connected to third rectifier 26 and third filter 82. Control circuits 84, 85 and 86 are connected to the DC control windings for the control of the respective outputs OUT1–OUT3.

It will be appreciated by those of skill in the art that a full-bridge inverter may be used in place of half-bridge inverter 76 illustrated in FIG. 4. The inverter should be of a type to produce a quasi-square wave at a fixed operating frequency.

Figure 5:
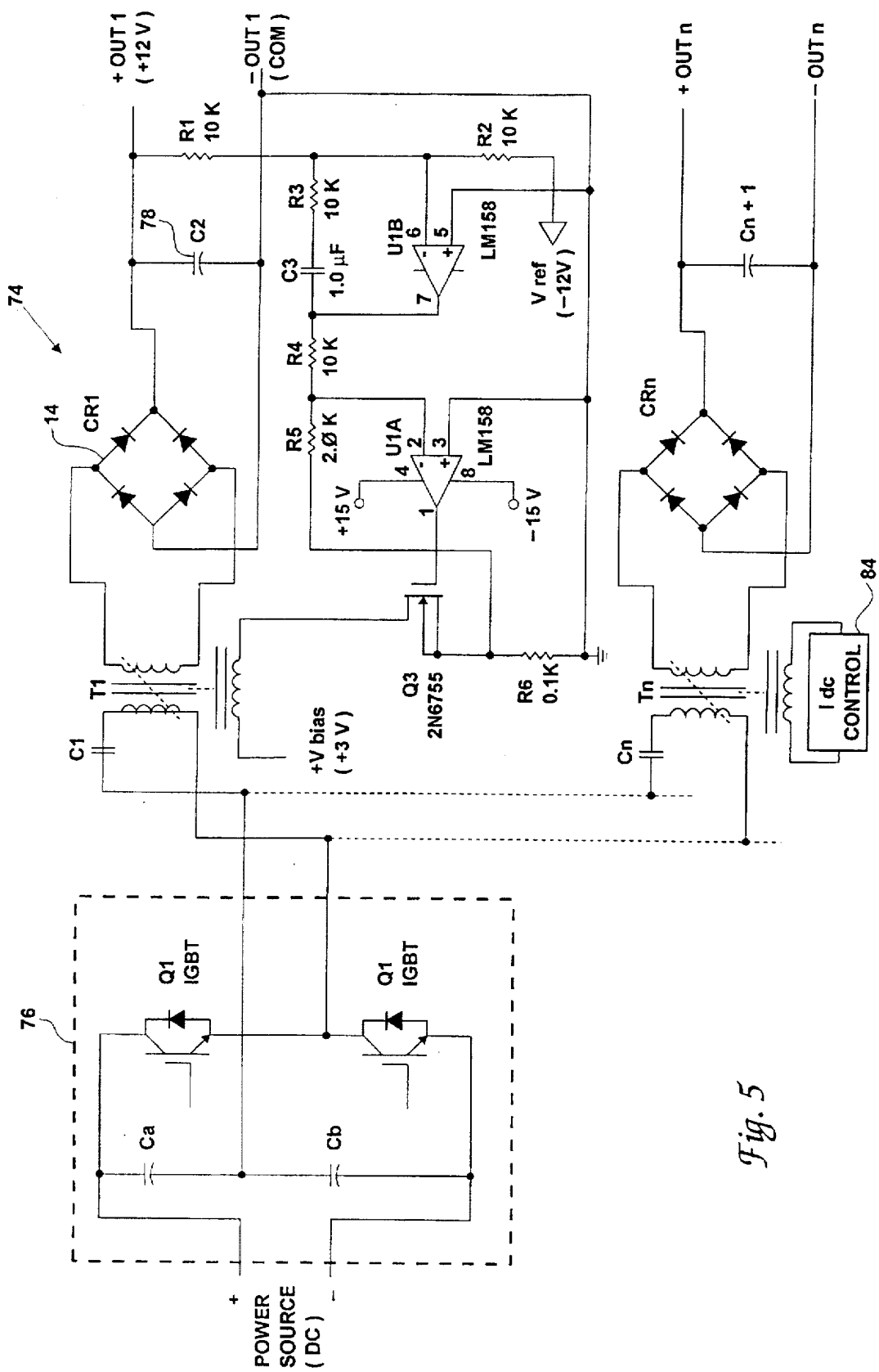
FIG. 5 is a schematic diagram of the multiple output circuit of FIGS. 2 and 4 illustrating one embodiment of the transformer control circuit in detail.

Referring now to FIG. 5, there is shown a schematic diagram of the multiple output circuit of FIGS. 2 and 4 illustrating one embodiment of the control circuitry in detail. In this embodiment, R1 connects the 12 volt output of OUT1 to error amplifier U1B where the signal is compared to a 12 volt reference (V ref). The control circuit is designed to produce zero output error. The voltage, +V bias, applied to the control winding of transformer T1 is adjusted through amplifier U1A, in this embodiment connected to a 15 Volt DC power supply, and diode Q3.

It will be appreciated by those of skill in the art that the control circuitry shown as regulating OUT1 in FIG. 5 may be repeated for each transformer coupled with an output in a multiple output application and also that output current and power can be controlled by similar means. It will also be appreciated that the control circuit illustrated comprises a voltage comparator which may be duplicated in function by the use of components other than those illustrated. However, such components should be selected while keeping the aforementioned advantages in mind. Specifically, few components having high reliability which consume little volume and which are low in weight are preferable to thereby minimize cost, improve reliability and reduce package size requirements when compared to other independently regulated multiple output power converters.

Figure 6:
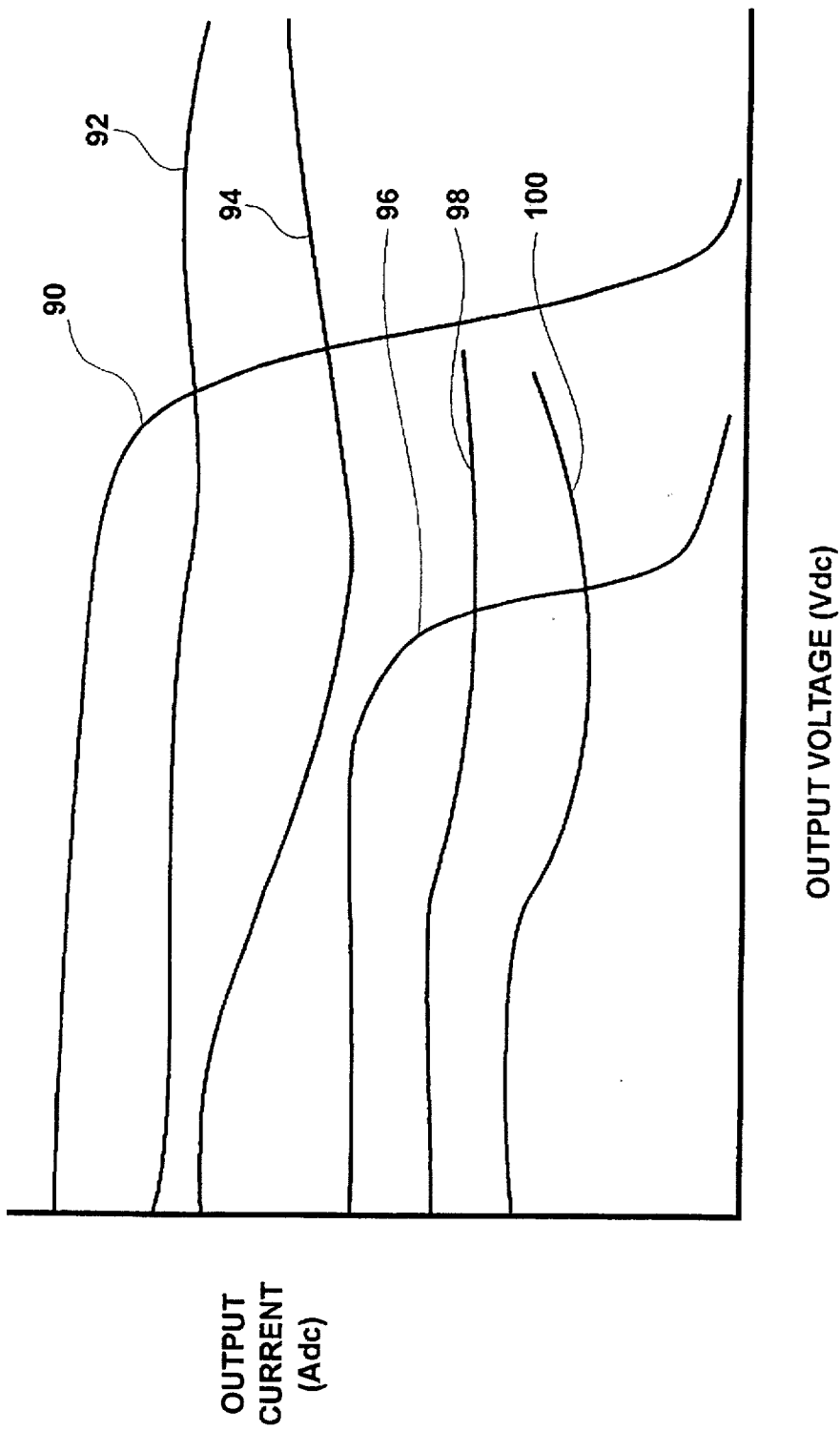
FIG. 6 is a graph illustrating the behavior of the output of a series resonant converter using the transformer of the present invention in response to the application of current to the DC windings of the transformer at two different input voltages.

FIG. 6 is a graph illustrating the behavior of the output of a series resonant converter employing the transformer of the present invention in response to the application of DC control current to the DC control windings at two different input voltages. Curve 90 represents the output current versus output voltage for an input voltage V1. Curve 96 represents the relationship of output current to output voltage of the same transformer at input voltage V2 which is less than input voltage V1. Note that as input voltage decreases from V1 to V2, for example, output current also reduces to a lower level and the output voltage threshold (the output voltage at which the output current drops rapidly toward zero) is less than the output voltage threshold at a higher voltage. In this manner, when no DC current is applied to the DC windings of the transformer, the tank behaves as a prior art series resonant regulator as previously described. Specifically, when no DC control current is applied, the output current is relatively constant until the voltage conversion ratio is in excess of unity (until the output voltage threshold is exceeded).

The reduction of output current to near zero at the output voltage threshold is unacceptable in some applications. Consider, for example, application of the multiple output resonant power conversion in an automobile wherein the power supply comprises the vehicle's battery. When battery voltage is low, as in a startup condition, for example, the desired output current at a desired output voltage may not be possible due to the drop-off of output current at the output voltage threshold. As a consequence, to achieve the desired output current and output voltage in such situations, many applications requiring the provision of power to multiple outputs have resorted to the implementation of multiple power converters or, in some instances, to the use of multiple power supplies.

Curves 92 and 94 are representative of the application of DC current to the control windings of the transformer of the present invention at an input voltage of V1. A larger DC current has been applied to result in curve 92 than was applied to generate curve 92. Note that, although the output current is somewhat reduced when DC control current is applied, the level of output current is extended through output voltage levels higher than was possible when no DC current was applied as shown by curve 90. Output current is non-zero beyond the conventional output voltage threshold.

A similar pattern is seen when DC current is applied to the transformer when input voltage is at V2. The application of DC current to the control windings at voltage V2 as shown by curves 98 and 100 also extends the range of output voltages over which a non-zero output current may be achieved. The ability to produce output current over a wide range of output voltages permits the power conversion circuit to be used to drive loads which could not be driven by a conventional series resonant power converter. For example, in the automotive application previously described, the reduction of input voltage generated by the vehicle's power supply at startup is no longer be an obstacle to implementing a multiple output power converter. The utilization of the multiple output circuit of the present invention therefore provides the designer with an opportunity to significantly reduce the cost of the power conversion circuitry and to increase reliability of the necessary circuitry.

At this point, it is useful to present the current characteristic of a series resonant converter using the transformer of the present invention. Consider the circuit of FIG. 5 wherein Power Source=200 Vdc, peak to peak Ca, Cb=100 uF, 500 Vpk Q1=Toshiba Part No. MG300J2YS1; operates with a constant 4.7 usec on-time at 75 KHZ C1=0.188 uF, 400 Vrms T1=Operating Frequency of 75 KHz; Resonating frequency of 150 KHz or greater; $L_{mag}$=207 uH; $L_{leak}$=5.5 uH In general, the application of no bias to the control winding of transformer T1 of the above example results in a signal OUT1 of approximately 11 amps DC up to an output voltage threshold of 90 Volts DC. When 1.0 amp DC of bias is applied to the control winding, output current of 9–10 amps DC results through and beyond 90 Volts DC; and when 2.0 amps DC is applied, 5–8 amps DC output results through and beyond 90 volts DC. Curves 90, 92 and 94 of FIG. 6 may be representative of such a circuit and the application of DC control current thereto.

As previously stated, when the transformer of the present invention is used in a series resonant converter, the output current behaves as a conventional series resonant converter when no DC control current is applied to the control winding of the transformer. Output current is essentially constant until the voltage conversion ratio exceeds unity (the "output voltage threshold") at which point the output current drops to zero. It will be appreciated by those of skill in the art that when a low to moderate bias current is applied to the control winding (for example, the 1.0 and 2.0 amps DC biases applied in the above example), the transformer of the present invention behaves like a resonating output transformer with low, magnetizing inductance. The magnetizing current results in a reduction of output current, but also permits output current to be generated beyond a voltage conversion ratio in excess of unity.

It will also be appreciated that use of a series resonant converter employing the transformer of the present invention is beneficial for power systems wherein it is desired to power one or more outputs in a power-up condition in which the input voltage is significantly lower than during normal operation. By extending the generation of non-zero output current over a wider range of output voltages, it is plausible that useable output (current and voltage) may be generated at the power-up input voltage in instances where no current is generated by a conventional series resonant converter.

It will be further appreciated that the transformer of the present invention may be implemented in a myriad of power conversion applications whether single or multiple outputs are to be supplied with power. The transformer may be used in high power applications (500 W to 2 KW, for example) or it may be used where small transformers, such as is in small automotive power supplies of 1 W or higher, are utilized.

While this invention has been described as having preferred designs, the present invention can be further modified within the spirit and scope of this disclosure. This application is therefore intended to cover any variations, uses or adaptations of the invention using its general principles. Further, this application is intended to cover such departures from the present disclosure as come within known or customary practice in the art to which this invention pertains and which falls within the limits of the appended claims.

I claim:

1. A power conversion circuit, comprising:
    an AC power source having a constant frequency;

a resonant capacitor connected to said power source;

a transformer comprising a magnetic core, a primary winding wound on a first portion of said core, said primary winding connected in series with said resonant capacitor, a secondary winding wound on a second portion of said core and loosely coupled with said primary winding, and a control winding wound on said core, said primary, secondary and control windings arranged so that substantially all of the magnetic flux generated by said control winding flows through said first and second portions of said core, said control winding saturating said first and second portions of said core in response to the application of direct current thereto; and an output connected to said secondary winding.

2. The circuit of claim 1, wherein said core of said transformer comprises an E-shaped core having first, second and third legs, said third leg positioned between said first and second legs, and wherein said primary and secondary windings of said transformer are wound about the third leg, said control winding comprising:

first and second interconnected DC control windings, said first DC control winding wound on said first leg and said second DC control winding wound on said second leg.

3. The circuit of claim 2, wherein said first and second DC windings are interconnected in series.

4. The circuit of claim 2, wherein said first and second DC windings are interconnected in parallel.

5. The circuit of claim 1, wherein said core of said transformer comprises first and second toroidal cores having centers which are axially aligned, wherein said primary winding of said transformer is wound on both said first and second toroidal cores on the same side of the centers thereof, wherein said secondary winding of said transformer is wound on said first and second toroidal cores on the same side of the centers thereof and opposite the portion of first and second toroidal cores having said primary winding wound thereon, said control winding comprising;

first and second interconnected DC control windings, said first DC control winding wound on said first toroidal core between said primary winding and said secondary winding, and said second DC control winding wound on said second toroidal core between said primary winding and said secondary winding.

6. The circuit of claim 1, wherein said core of said transformer comprises an E-shaped core having first, second and third legs, said third leg positioned between said first leg and said second leg, each said leg having a first half and a second half; wherein said primary winding of said transformer comprises first and second primary windings electrically interconnected in series, said first primary winding wound on said first half of said first leg, and said second primary winding wound on said first half of said second leg; wherein said secondary winding of said transformer comprises first and second secondary windings interconnected in series, said first secondary winding wound on said second half of said first leg, and said second secondary winding wound on said second half of said second leg; and wherein said control winding of said transformer is wound on said third leg of said core.

7. The circuit of claim 1, wherein said core of said transformer comprises first and second toroidal cores having centers which are axially aligned; wherein said primary winding of said transformer comprises first and second primary windings electrically connected in series, said first primary winding wound on one side of said center of said first toroidal core and said second primary winding wound on the same side of said center on said second toroidal core; wherein said secondary winding comprises first and second secondary windings electrically connected in series, said first second winding wound on said first toroidal core opposite said first primary winding, and said second secondary winding wound on said second toroidal core opposite said second primary winding; and wherein said control winding is wound on both said first and second toroidal cores between said first and second toroidal cores between said first primary winding and said first secondary winding on said first toroidal core and between said second primary winding and said second secondary winding on said second tororidal core.

8. The circuit of claim 1, further comprising a DC power supply connected to said control winding for applying DC control voltage to said control winding.

9. A power conversion circuit comprising:

a resonant capacitor; and a transformer comprising a magnetic core comprising first and second toroidal core halves having centers which are axially aligned, said core halves being joined at an interface in a plane transverse to the core axis, an annular internal cavity in said core at said interface and disposed about the axis of the core, a primary winding, a secondary winding and a control winding disposed on said core, said control winding disposed in the cavity, said primary winding wound on one side of said core in a direction perpendicular to said control winding and connected to said resonant capacitor, said secondary winding wound on the other side of said core in a direction perpendicular to said control winding.

10. A series resonant converter, comprising:

an AC power source having a constant frequency;

a transformer, said transformer comprising a magnetic core, a primary winding wound on a first portion of said core, a secondary winding wound on a second portion of said core, said secondary winding loosely coupled with said primary winding, and a control winding wound on said core, said primary, secondary and control windings arranged so that substantially all of the magnetic flux generated by said control winding flows through said first and second portions of said core, said control winding saturating said first and second portions of said core in response to the application of direct current thereto;

a resonant capacitor connected in series between said AC power source and said primary winding; and an output connected to said secondary winding.

11. The converter of claim 10, further comprising:

a DC power supply; and means for controlling the level of DC current applied to said control winding, said control means connected to said DC power supply and to said control winding.

12. The converter of claim 11, wherein said control means comprises:

a voltage comparator connected to a reference voltage, said comparator comparing the output voltage of said converter to said reference voltage and adjusting the level of DC current applied to said control winding accordingly.

13. A multiple output power converter, comprising:

a source of AC power having a constant frequency; and a plurality of LC resonant circuits connected to said AC source, each said LC resonant circuit comprising
- a resonant capacitor,
- a transformer having a magnetic core, a primary winding wound on a first portion of said core and connected in series with said resonant capacitor, a secondary winding wound on a second portion of said core and loosely coupled with said primary winding, and a control winding wound on said core, said primary, secondary and control windings arranged so that substantially all of the magnetic flux generated by said control winding flows through said first and second portions of said core, said control winding saturating said first and second portions of said core in response to the application of direct current thereto, and
- an output, whereby each of said outputs of said LC resonant circuits is independently regulated by application of direct current to said respective control winding.

14. The power converter of claim 13, further comprising:

a plurality of rectifiers associated respectively with said LC resonant circuits, each said rectifier having an input and an output, said input of each said rectifier connected in series with said respective LC resonant circuit for rectifying the output thereof; and a plurality of filters associated respectively with said LC resonant circuits, each said filter having an input and an output, said input of each said filter connected with said respective rectifier for filtering the rectified output thereof.

* * * * *